(12) United States Patent
Asano et al.

(10) Patent No.: US 8,421,295 B2
(45) Date of Patent: Apr. 16, 2013

(54) STATOR FOR ELECTRIC ROTATING MACHINE WITH ENHANCED COOLING ABILITY

(75) Inventors: Nobuhiro Asano, Okazaki (JP); Atsuo Ishizuka, Nagoya (JP)

(73) Assignee: Denso Corporation, Kariya (JP)

( * ) Notice: Subject to any disclaimer, the term of this patent is extended or adjusted under 35 U.S.C. 154(b) by 301 days.

(21) Appl. No.: 13/011,249

(22) Filed: Jan. 21, 2011

(65) Prior Publication Data

US 2011/0181146 A1    Jul. 28, 2011

(30) Foreign Application Priority Data

Jan. 22, 2010   (JP) ................... 2010-011829
Sep. 16, 2010   (JP) ................... 2010-207537

(51) Int. Cl.
*H02K 3/04*   (2006.01)
(52) U.S. Cl.
USPC ......................................... 310/210; 310/206
(58) Field of Classification Search .................. 310/201, 310/206, 207, 208
See application file for complete search history.

(56) References Cited

U.S. PATENT DOCUMENTS

| 6,770,999 | B2 * | 8/2004 | Sakurai ................... 310/208 |
| 2006/0214522 | A1 * | 9/2006 | Kawano ................... 310/59 |
| 2006/0226727 | A1 * | 10/2006 | Bramson et al. ........... 310/180 |
| 2009/0267441 | A1 | 10/2009 | Hiramatsu et al. |

FOREIGN PATENT DOCUMENTS

JP         2009-195004         8/2009

* cited by examiner

*Primary Examiner* — Nguyen N Hanh
(74) *Attorney, Agent, or Firm* — Nixon & Vanderhye PC

(57) ABSTRACT

A stator for an electric rotating machine is provided which is equipped with a stator coil. The stator coil has a plurality of in-slot portions arrayed within each of slots formed in a stator core in a radial direction of the stator core. Adjacent two of the in-slot portions disposed in each of the slots have radially-facing surfaces which extend in non-parallel to one another at least one of ends of the in-slot portions. The non-parallel orientation of the radially-facing surfaces avoids close contact between entire areas thereof when the in-slot portions move undesirably within the slot in the radial direction of the stator core. In other words, a gap is kept between the radially-facing surfaces and serves as a radiator to dissipate heat, as generated in the in-slot portions.

11 Claims, 11 Drawing Sheets

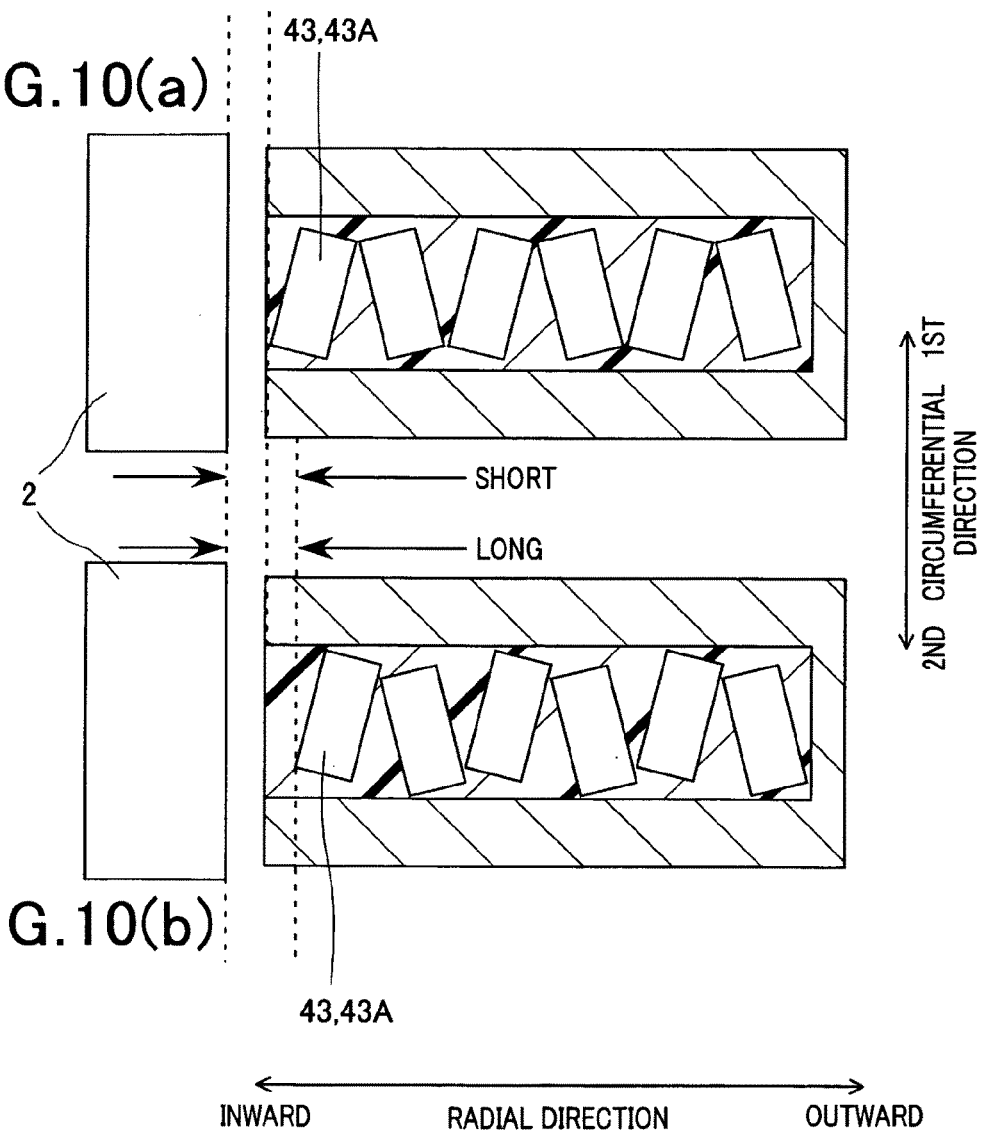

STATOR FOR ELECTRIC ROTATING MACHINE WITH ENHANCED COOLING ABILITY

CROSS REFERENCE TO RELATED DOCUMENT

The present application claims benefits of Japanese Patent Application No. 2010-11829 filed on Jan. 22, 2010 and Japanese Patent Application No. 2010-207537 filed on Sep. 16, 2010, disclosures of which are incorporated herein by reference.

BACKGROUND OF THE INVENTION

1 Technical Field of the Invention

The present invention relates generally to a stator for an electric rotating machine designed to ensure effective dissipation of heat from a stator coil.

2 Background Art

Stators for use in electric rotating machines are known which are equipped with a hollow cylindrical stator core in which a plurality of slots are arrayed in a circumferential direction thereof and a stator coil which is made up of a plurality of conductor wires wound through the slots of the stator core.

Japanese Patent First Publication No. 2009-195004 teaches the above type of a stator coil which is formed by multi-phase windings (e.g., a U-phase winding, a V-phase winding, and a W-phase winding) made by conductor wires disposed in slots of a stator core. In order to improve the packing factor of the conductor wires, the conductor wires are each designed to be rectangular in cross section traversing a length of the conductor wires. Additionally, each of the multi-phase windings is bent in the form of a crank when developed. The phase windings are wound several times and spiraled into a hollow cylindrical form.

The conductor wires include in-slot portions which are arrayed in each of the slots in a radial direction of the stator core and square in transverse cross section thereof. The in-slot portions are, as illustrated in FIG. 12, arranged within each of the slots close to each other in order to increase the packing factor thereof. Specifically, entire surfaces of adjacent two of the in-slot portions which face one another in the radial direction of the stator core are placed in contact with each other.

The stator of the electric rotating machine usually has the problem that heat generated by the stator coil results in a deterioration in magnetic property thereof. The heat is transmitted from the stator coil to the stator core and then released or dissipated. If however, a sufficient quantity of heat is not dissipated, it will cause the temperature of the stator coil itself to rise, thus resulting in an increase in electric resistance of the conductor wires of the stator coil. This also gives rise to heating of the conductor wires.

In the layout of the in-slot portions in FIG. 12, the entire surfaces of adjacent two of the in-slot portions are in close contact with each other or abut each other through a little gap, thereby leading to increased difficulty in transmission of the heat from the in-slot portions to the stator core.

SUMMARY OF THE INVENTION

It is therefore a principal object of the invention to provide a stator for an electric rotating machine which is designed to enhance dissipation of heat from a stator coil.

According to one aspect of the invention, there is provided a stator for an electric rotating machine such as an electric motor, an electric generator, or a motor-generator. The stator comprises: (a) a cylindrical stator core which has a plurality of slots arrayed in a circumferential direction of the stator core; and (b) a stator coil wound in the stator core. The stator coil has a plurality of in-slot portions arrayed within each of the slots in a radial direction of the stator core. Each of the in-slot portions extends in an axial direction of the stator core within a corresponding one of the slots. Adjacent two of the in-slot portions disposed in each of the slots have radially-facing surfaces which face each other in the radial direction of the stator core and extend in non-parallel to one another at least one of ends of the adjacent two in-slot portions.

For example, the in-slot portions may be, as illustrated in FIG. 11, arrayed to have the radially-facing surfaces extending in non-parallel to one another at least one of the ends of the in-slot portions. The non-parallel orientation of the radially-facing surfaces avoids close contact between entire areas thereof when the in-slot portions move undesirably within the slot in the radial direction of the stator core. In other words, the gap is kept between the radially-facing surfaces in the vicinity of at least one of the ends of the stator core. The gap is a space unoccupied by the in-slot portions and will not be a heat source when the stator coil is excited electrically, but serve as a radiator to which heat is transmitted from the in-slot portions and then dissipated. This minimizes a rise in temperature of the in-slot portions of the stator coil and avoids an increase in electric resistance of the in-slot portions.

The interval between the radially-facing surfaces of the two adjacent in-slot portions is not constant over the width thereof. A greater gap through which corners or ends of the radially-facing surfaces are farther away from each other works to diffuse the heat from the in-slot portions, which is, in turn, transmitted to the stator core and dissipated. Specifically, the heat flows, as indicated by broken arrows in FIG. 11, from the in-slot portions to the stator core to cool the stator.

The gap between the radially-facing surfaces of the in-slot portions also permits the in-slot portions to be vibrated or oscillated by the Lorentz force produced when the stator coil is excited, thus avoiding the physical damage to the stator coil itself.

The gap kept between the radially-facing surfaces also serves to decrease the quantity of heat to be transmitted between the in-slot portions, thus minimizing the quantity of heat accumulated in the stator coil. This minimizes a rise in temperature of the in-slot portions of the stator coil and avoids an undesirable increase in electric resistance of the in-slot portions.

In the preferred mode of the invention, an interval between portions of the radially-facing surfaces on a side of a first circumferential direction that is one of circumferential directions of the stator core is different from that between portions of the radially-facing surfaces on a side of a second circumferential direction that is the other of the circumferential directions of the stator core at the at least one of the ends of the adjacent two in-slot portions. This results in formation of a gap between the portions of the radially-facing surfaces on either side of the first circumferential direction or the second circumferential direction, thus minimizing a rise in temperature of the stator coil.

The interval between the portions of the radially-facing surfaces of a first pair of adjacent two of the in-slot portions on the side of the first circumferential direction maybe greater than that between the portions of the radially-facing surfaces of the first pair on the side of the second circumferential direction at the at least one of the ends, while the interval between the portions of the radially-facing surfaces of a second pair of adjacent two of the in-slot portions next to the first pair on the side of the first circumferential direction may be smaller than that between the portions of the radially-facing surfaces of the first pair on the side of the second circumferential direction at the at least one of the ends. In other words, the intervals between the circumferentially spaced ends of the radially-facing surfaces of the in-slot portions are different from each other and change in relation in magnitude therebetween alternately in the radial direction of the stator core. This avoids the concentration of distribution of temperature of the stator core. Specifically, a greater gap through which the radially-facing surfaces are farther away from each other is less susceptible to heat from the adjacent in-slot portions than a smaller gap through which the radially-facing surfaces are closer to each other and thus has a higher degree of ability in radiating the heat. If lots of such greater gaps exist close to either side inner wall of the slot, it will result in a deviation in quantity of heat to be dissipated in the circumferential direction of the stator core within the slot, which leads to a non-uniform distribution of temperature in the stator core, thus resulting in an increase in electric resistance of a higher temperature portion of the stator core.

An interval between portions of the radially-facing surfaces on the side of the first circumferential direction may be greater than that between portions of the radially-facing surfaces on the side of the second circumferential direction at one of the ends of the adjacent two in-slot portions, while an interval between the portions of the radially-facing surfaces on the side of the first circumferential direction is smaller than that between portions of the radially-facing surfaces on the side of the second circumferential direction at the other end of the adjacent two in-slot portions. Specifically, the in-slot portions are twisted. For example, the in-slot portions may be twisted at middles thereof. This minimizes undesirable movement of the in-slot portions in the axial direction of the stator core within the slots and ensures the stability in positional relation between the stator coil and the stator core.

The radially-facing surfaces of the two adjacent in-slot portions may extend in parallel to one another at middles intermediate between the ends thereof, thereby ensuring a gap therebetween which is great enough to dampen vibrations of the in-slot portions in the radial direction of the stator core which arise from the Lorentz force.

The stator may also include an impregnating material disposed in a space between each of the slots and the in-slot portions arrayed in the slot. The impregnating material works to transmit the heat from the in-slot portions to the stator core, thereby decreasing a rise in temperature of the in-slot portions of the stator coil and avoids an undesirable increase in electric resistance of the in-slot portions.

The impregnating material also serves as a damper or absorber to absorb the vibrations of the in-slot portions arising from the Lorentz force, thus avoiding collision between the in-slot portions and physical damage thereto.

The impregnating material may be greater in coefficient of thermal conductivity than air, thereby dissipating a more quantity of heat from the stator coil.

The stator core may include back core bases and teeth two of which extend from one of the back core bases in the radius direction of the stator core to define each of the slots. An interval between the radially-facing surfaces of adjacent two of the in-slot portions which are located within the slot farther from the back core base may be greater than that between the radially-facing surfaces of adjacent two of the in-slot portions which are located within the slot closer to the back core base. This enhances the dissipation of heat from the stator coil. Specifically, the heat, as generated by the in-slot portions of the stator coil, is transmitted to and radiated from the teeth of the stator core. The heat in ends of the teeth joined to the back core base is also transmitted to and radiated from the back core base. The heat inputted to tips of the teeth from the stator coil is not transmitted greatly to the back core base. In other words, the tips of the teeth exhibit a lower degree of ability in radiating the heat. In order to alleviate this drawback, the stator core is so designed that the greater gap is formed between the radially-facing surfaces of the in-slot portions which are located radially inward of the stator core, that is, close to the tips of the teeth, thereby enhancing the dissipation of heat inputted to the tips of the teeth.

The stator coil may also include turned portions each of which is disposed outside the slots and connects two of the in-slot portions which are disposed in two of the slots, respectively, which are spaced in a circumferential direction of the stator core. Ones of the turned portions which connect with the in-slot portions disposed in one of the slots may be arrayed in a depth-wise direction of the slot and extend in opposite circumferential directions of the stator core alternately. This facilitates ease of orienting the radially-facing surfaces in non-parallel to one another.

At least one of the turned portions may connect conductor segments making up the stator coil. For example, the conductor segments may be, as illustrated in FIG. 8, joined together at ends thereof (i.e., the turned portions) extending outside at least one of the ends of the stator core. The ends of the turned portions may extend in parallel to an axial direction of the conductor segments (i.e., the stator core) and joined together to make a coil end of the stator coil. The ends of the conductor segments have side surfaces placed in contact with each other and serve as radiator fins to dissipate heat from the in-slot portions of the stator coil.

The stator coil may be rectangular or square in transverse cross section thereof. This facilitates the ease of orienting the radially-facing surfaces in non-parallel to one another.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 5(*b*) is a traverse sectional view which shows a modification of the winding of FIG. 5(*a*);

FIG. 7(*b*) is a transverse sectional view which shows a central portion of a stator core intermediate between axially-opposed ends of the stator core;

FIG. 10(a) is a view which illustrates a positional relation between a rotor and an array of in-slot portions, as illustrated in FIG. 7(a);

FIG. 10(b) is a view which illustrates a positional relation between a rotor and an array of in-slot portions, as illustrated in FIG. 9(a);

DESCRIPTION OF THE PREFERRED EMBODIMENTS

Figure 1:
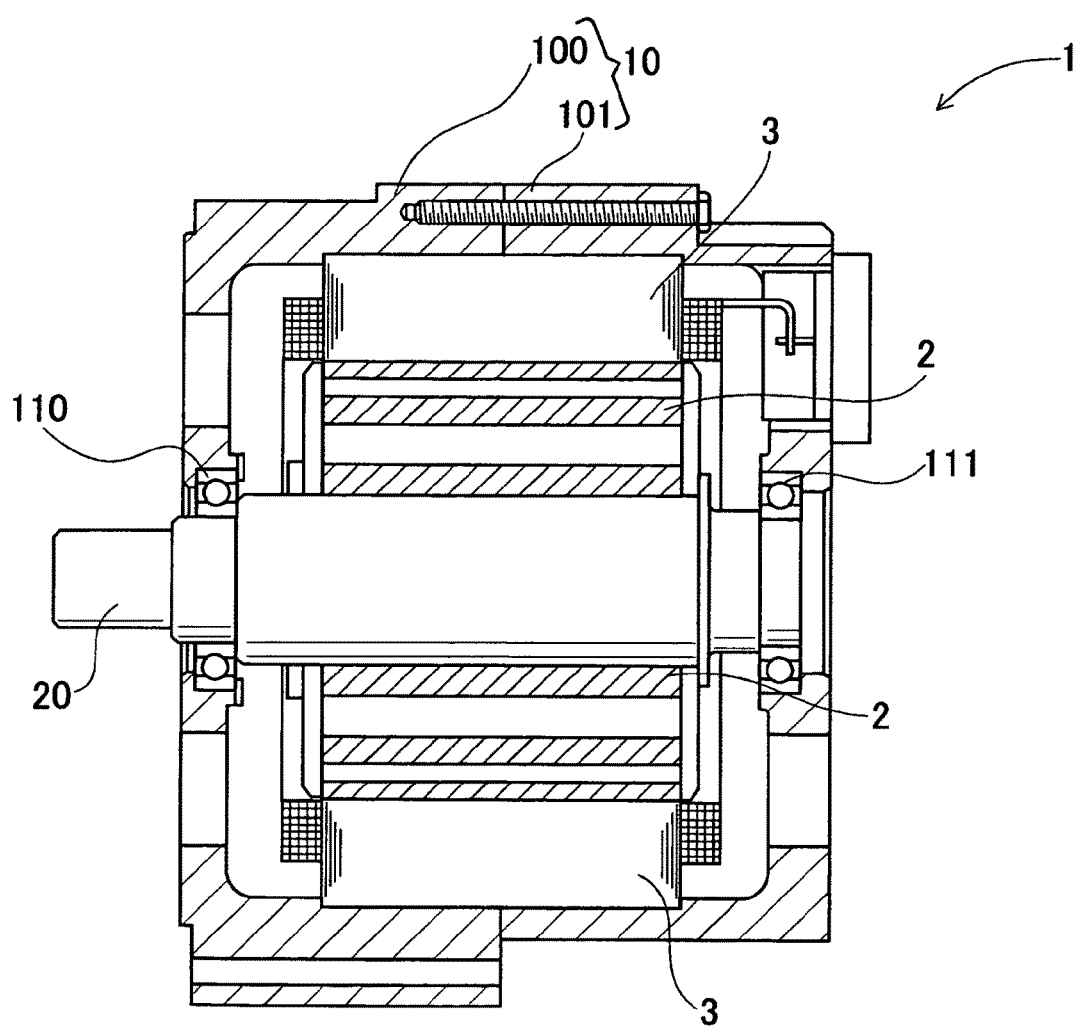
FIG. 1 is a longitudinal sectional view which shows an internal structure of an electric rotating machine equipped with a stator according to the invention.

Referring to the drawings, wherein like reference numbers refer to like parts in several views, particularly to FIG. 1, there is shown an electric rotating machine 1 equipped with a stator 3 according to an embodiment of the invention which may be employed as a motor-generator for automotive vehicles.

The electric rotating machine 1 includes a hollow housing 10, a rotor 2, and the stator 3. The housing 10 is made up of a front cup 100 and a rear cup 101 which are joined at openings thereof together. The housing 10 has installed therein bearings 110 and 111 through which a rotating shaft 20 is retained to be rotatable. The rotor 2 is fit on the rotating shaft 20. The stator 3 is disposed inside the housing 10 and surrounds the periphery of the rotor 2.

The rotor 2 has a plurality of permanent magnets arrayed on an outer circumference thereof facing an inner circumference of the stator 3. The permanent magnets are so oriented as to have S-poles and N-poles arrayed alternately in the circumferential direction of the rotor 2. The number of the poles depends upon the type of the electric rotating machine 1. In this embodiment, the rotor 2 has four S-poles and four N-poles. A total lumber of the poles is eight (8).

Figure 2:
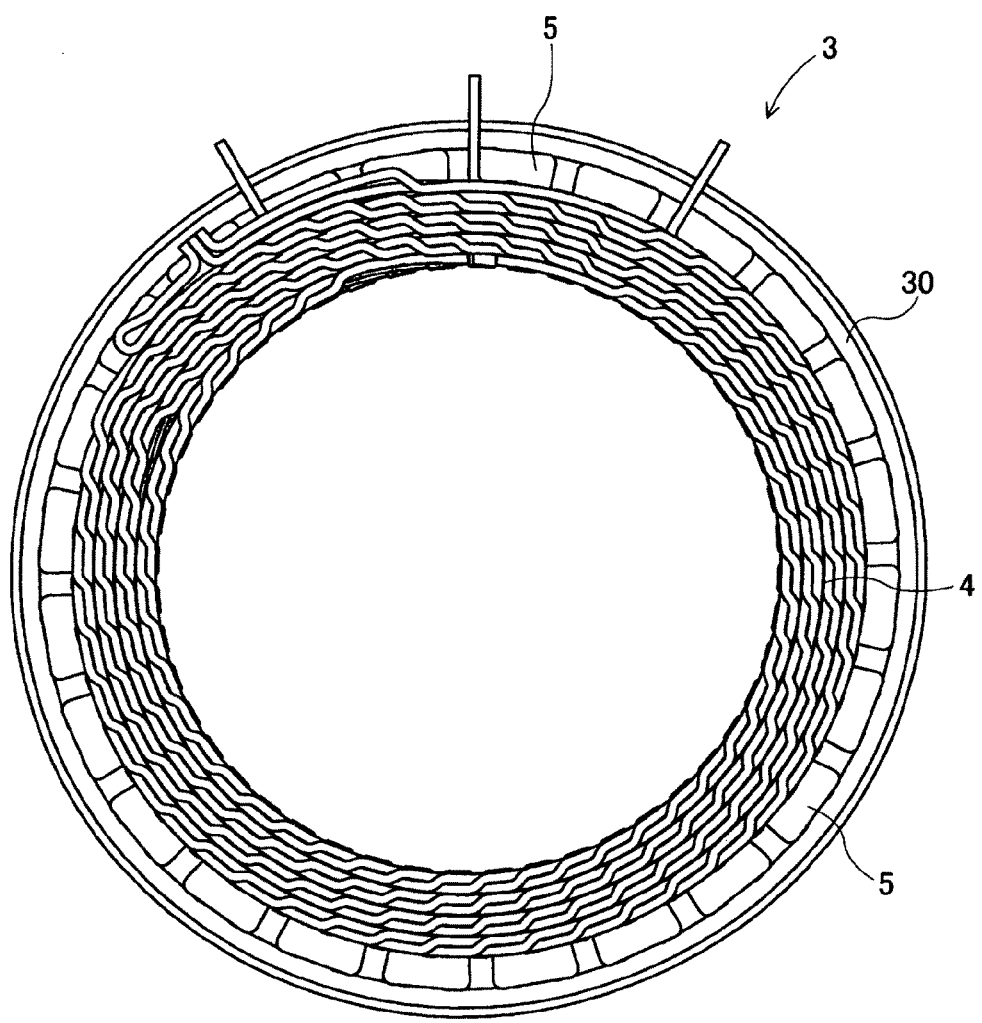
FIG. 2 is a plane view which shows a stator installed in the electric rotating machine of FIG. 1.

The stator 3 is, as illustrated in FIG. 2, equipped with a stator core 30, a three-phase coil 4 made up of a plurality of phase-windings, and electrical insulating paper 5 disposed between the stator core 30 and the coil 4.

Figure 3:
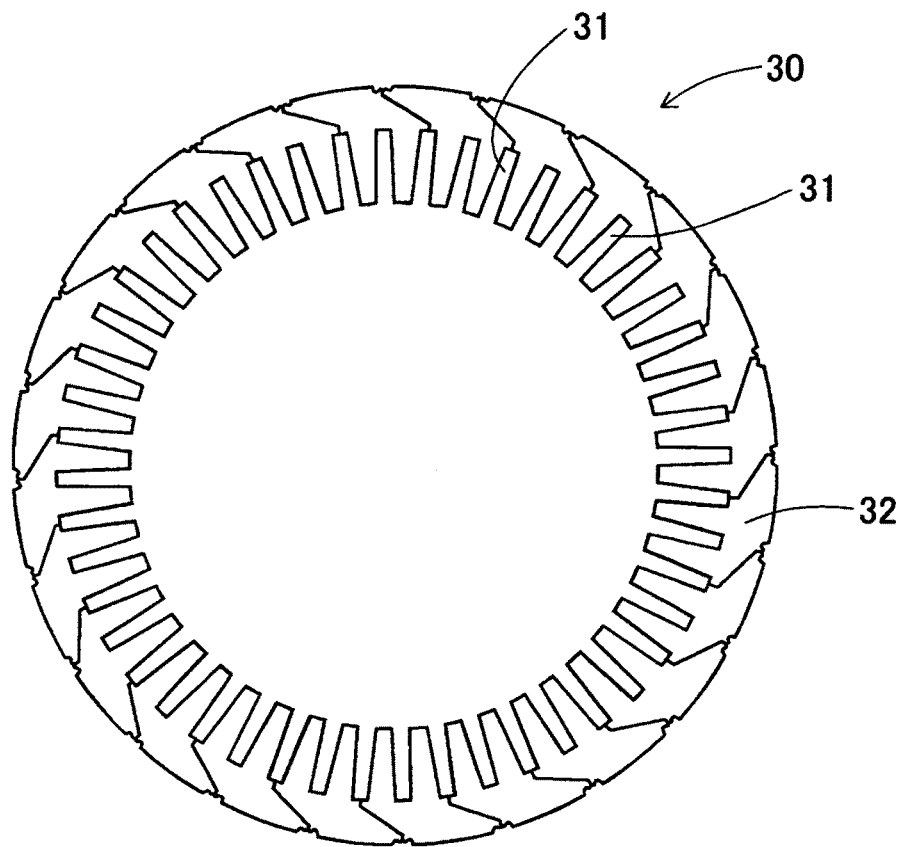
FIG. 3 is a plane view which shows a structure of a stator core of the stator in FIG. 2.

The stator core 30 is, as illustrated in FIG. 3, of an annular shape and has a plurality of slots 31 formed in an inner circumference thereof. The slots 31 is oriented radially of the stator core 30. In other words, each of the slots 31 has a depth extending toward the center of the stator core 30. The slots 31 are provided two for each of the three phases of the coil 4 for each pole of the stator 3. Specifically, a total number of the slots 31 is forty eight (48)=8×3×2.

Figure 4:
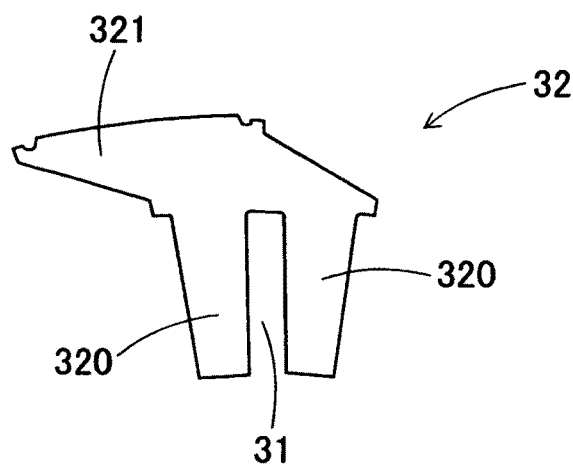
FIG. 4 is a plane view which shows a core piece that is a part of the stator core of FIG. 3.

The stator core 30 is, as illustrated in FIG. 4, an assembly of twenty four (24) core pieces 32 arrayed in a circle. Each of the core pieces 32 has one of the slots 31 and is so shaped as to define two of the slots 31 along with left and right adjacent ones of the core pieces 32. Specifically, each of the core pieces 32 is made up of two teeth 320 extending in the radius direction of the stator core 30 and a back core base 321 connecting between the teeth 320.

Each of the core pieces 32 is made of a stack of magnetic steel sheets. The stator core 30 may alternatively be made of a stack of typically known metal sheets and insulating films.

Figure 5A:
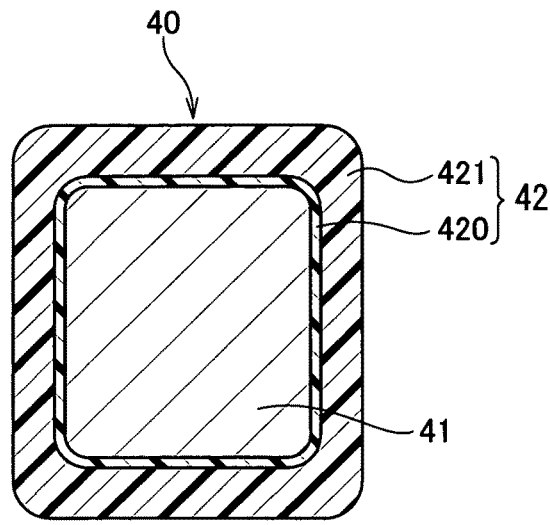
FIG. 5(*a*) is a traverse sectional view which shows a winding of a stator coil installed in the electric rotating machine of FIG. 1.

The stator coil 4 is formed by winding a plurality of conductor wires 40 in a given manner. Each of the conductor wires or windings 40 is, as illustrated in FIG. 5(a), rectangular in transverse cross section and made of a copper conductor 41 and an insulating film 42 wrapped about the conductor 41. The insulating film 42 includes an inner layer 420 and outer layer 421. A total thickness of the insulating film 42 (including thicknesses of the inner and outer layers 420 and 421) is 100 µm to 200 µm. Such a great thickness of the insulating film 42 eliminates the need for insulating the windings 40 electrically from each other using an insulator, but insulating sheet 5, as illustrated in FIG. 2, may be interposed between the windings 40.

Figure 5B:
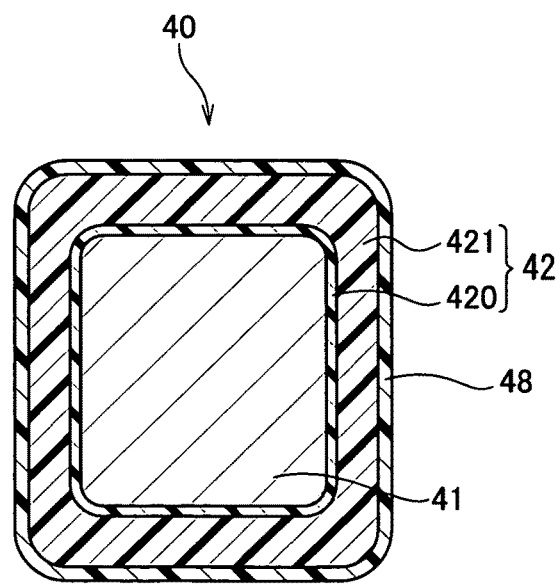

The windings 40 of the stator coil 4, as illustrated in FIG. 5(b), may also have a fusible bonding material 48 such as epoxy resin with which the insulating film 42 is covered. When subjected to heat generated in the electric rotating machine 1, the fusible bonding material 48 usually melts at an earlier time than the insulating film 42, thereby causing the windings 40 in each of the slots 31 to be bonded thermally to each other through the fusible bonding material 48.

Figure 6:
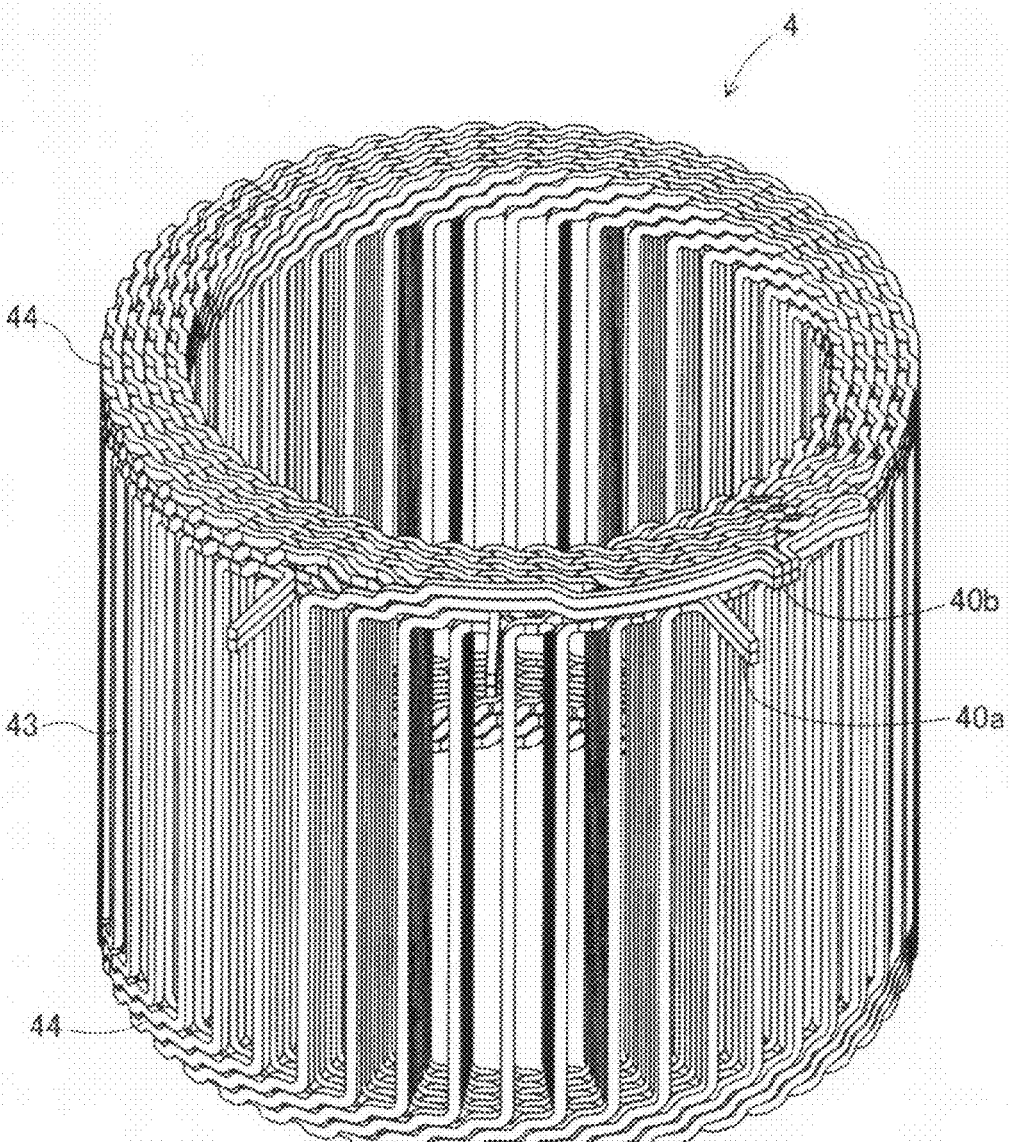
FIG. 6 is a perspective view which shows the stator coil installed in the electric rotating machine of FIG. 1.

The stator coil 4 is, as illustrated in FIG. 6, constructed by the windings 40 wound together in a predetermined shape. The windings 40 are wave-wound through an inside circumference of the stator core 30. Each of the windings 40 has straight in-slot portions 43 disposed in the slots 30 and turned portions 44 each of which connects two of the in-slot portions 43. The in-slot portions 43 of each of the windings 40 are accommodated in the slots 31 which are located at an interval of a selected number of the slots 31 (3 phases×2=6 slots 31 in this embodiment) away from each other. The turned portions 44 project from the axial ends of the stator core 30.

Each of the turned portions 44, as can be seen from FIG. 6, is bent stepwise in the axial direction of the stator core 30 (i.e., the stator coil 4). The middle of the turned portion 44 is bent in the radial direction of the stator core 30 in the form of a crank without twisting.

Figure 7A:
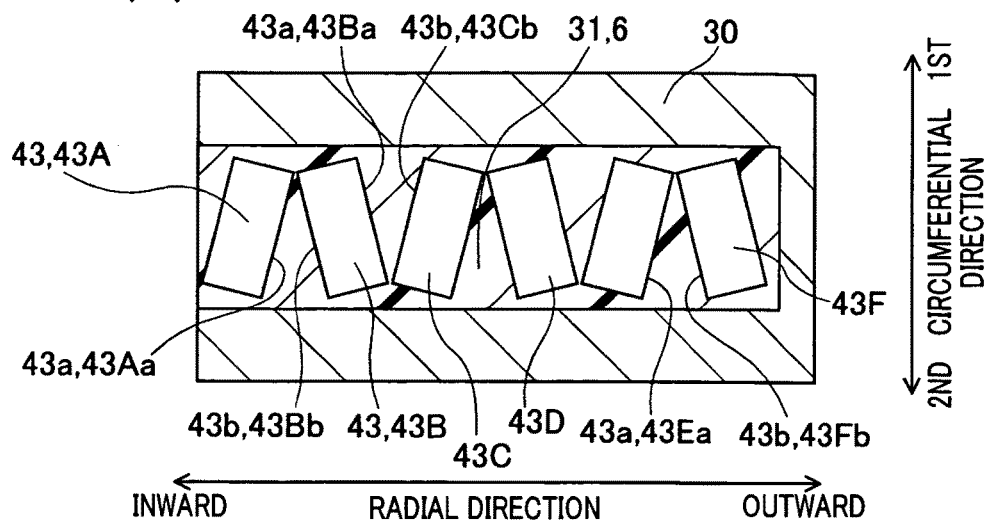
FIG. 7(*a*) is a transverse sectional view which shows a portion of a stator core close to one of axially-opposed ends of the stator core.
FIG. 7(c) is a transverse sectional view which shows a portion of a stator core close to the other of the axially-opposed ends of the stator core, as illustrated in FIG. 7(a)
Figure 7B:
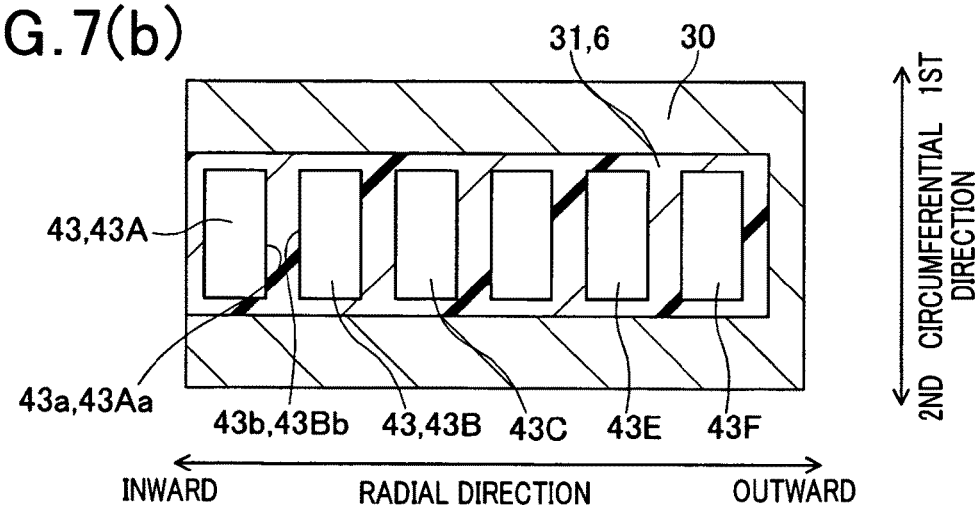
Figure 7C:
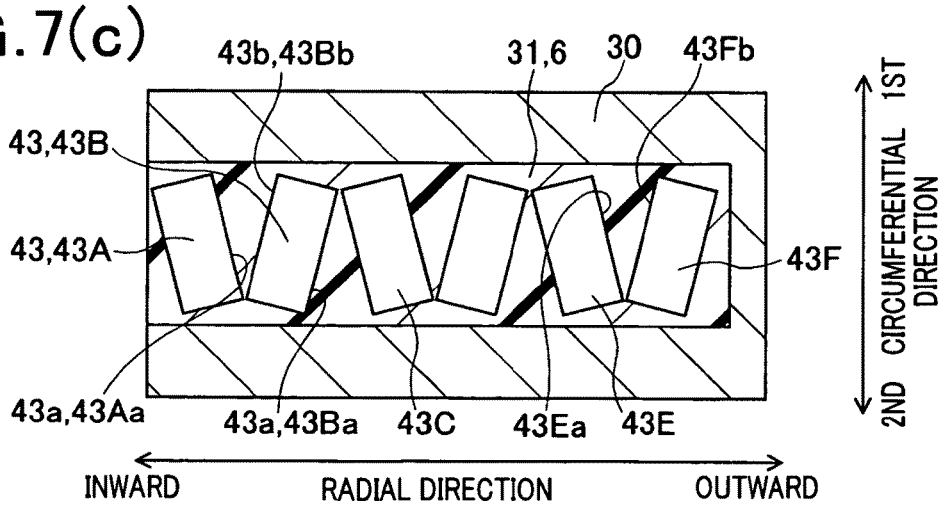

The in-slot portions 43 of the stator coil 4 are, as clearly illustrated in FIGS. 7(a) to 7(c), arrayed within each of the slots 31 in the form of multiple layers in the radial direction of the stator core 30 (i.e., a depthwise direction of the slot 31).

Each of the slots 31 of the stator core 3 is filled with an impregnating material 6 made of epoxy resin. Specifically, the impregnating material 6 is disposed at least in a space between an inner wall of each of the slots 31 and the in-slot portions 43.

FIGS. 7(a) to 7(b) schematically illustrate the layout of the in-slot portions 43 of the stator coil 4 in one of the slots 31, as viewed from the same axial direction of the stator core 30. FIG. 7(a) is a transverse sectional view which shows a portion of the stator core 30 close to one of the axially-opposed ends of the stator core 30. FIG. 7(b) is a transverse sectional view which shows a central portion of the stator core 30 intermediate between the axially-opposed ends of the stator core 30. FIG. 7(c) is a transverse sectional view which shows a portion of the stator core 30 close to the other end of the stator core 30.

The in-slot portions 43, as can be seen from FIGS. 7(a) and 7(c), extend at ends thereof non-parallel to each other in each of the slots 31. Specifically, side surfaces 43a and 43b of the ends of adjacent two of the in-slot portions 43 in the slot 31 which face each other in the radial direction of the stator core 30 are in non-parallel to one another.

In the layout of the ends of the in-slot portions 43 of the stator coil 4 illustrated in FIG. 7(a), one of the in-slot portions 43, as denoted by 43A, which is located radially innermost of the stator core 30 within the slot 31 has side surfaces which are opposite to each other in a circumferential direction of the stator core 30 and one of which is located more radially outward than the other. Specifically, one of the circumferentially-opposed side surfaces which faces in a first circumferential direction, as defined in the drawing, is located more radially outward of the stator core 30 than the other side surface which faces in a second circumferential direction. The in-slot portion 43B next to the in-slot portion 43A in the radially outward direction of the stator core 30 has a side surface which faces in the second circumferential direction and is located more radially outward than the other side surface facing in the first circumferential direction. The interval between an end of the side surface 43Aa of the in-slot portion 43A which faces in the radially outward direction of the stator core 30 and an end of the side surface 43Bb of the in-slot portion 43B which faces in the radially inward direction of the stator core 30 on the side of the first circumferential direction is shorter than that on the side of the second circumferential direction. In other words, the interval between the side surface 43Aa of the in-slot portion 43A and the side surface 43Bb of the in-slot portion 43B increases in the second circumferential direction. Conversely, the interval between the side surface 43Ba of the in-slot portion 43B which faces in the radially outward direction and the side surface 43Cb of the in-slot portion 43C which faces in the radially inward direction increases in the first circumferential direction. In other words, intervals between circumferentially spaced corners or ends of the radially-facing side surfaces 43a and 43b of adjacent two of the in-slot portions 43 are different from each other and change in relation in magnitude therebetween alternately in the radial direction of the stator core 30.

Changes in interval between the radially-facing side surfaces 43a and 43b of adjacent two of the in-slot portions 43 at the axially opposed ends of the in-slot portions 43 are, as can be seen from FIGS. 7(a) and 7(c), in opposite circumferential directions of the stator core 30. In other words, layouts of the transverse sections of the axially opposed ends of the in-slot portions 43 are mirror-symmetrical to one another, as viewed in FIGS. 7(a) and 7(c).

Specifically, in the layout of the ends of the in-slot portions 43 of the stator coil 4 illustrated in FIG. 7(c), the in-slot portion 43A which is located radially innermost of the stator core 30 within the slot 31 has side surfaces which are opposite to each other in the circumferential direction of the stator core 30 and one of which is located more radially outward than the other. Specifically, one of the circumferentially-opposed side surfaces which faces in the second circumferential direction is located more radially outward of the stator core 30 than the other side surface which faces in the first circumferential direction. The in-slot portion 43B next to the in-slot portion 43A in the radially outward direction of the stator core 30 has a side surface which faces in the first circumferential direction and is located more radially outward than the other side surface facing in the second circumferential direction. The interval between the side surface 43Aa of the in-slot portion 43A which faces the radially outward direction of the stator core 30 and the side surface 43Bb of the in-slot portion 43B which faces in the radially inward direction of the stator core 30 increases in the first circumferential direction. Conversely, the interval between the side surface 43Ba of the in-slot portion 43B which faces in the radially outward direction and the side surface 43Cb of the in-slot portion 43C which faces in the radially inward direction increases in the second circumferential direction. In other words, intervals between circumferentially spaced corners of the radially facing side surfaces 43a and 43b of adjacent two of the in-slot portions 43 are different from each other and changes in relation in magnitude therebetween alternately in the radial direction of the stator core 30.

The radially-facing side surfaces 43a and 43b of the middle portions of adjacent two of the in-slot portions 43 are, as illustrated in FIG. 7(b), extend parallel to one another.

In short, the in-slot portions 43 of the stator coil 4 are twisted in opposite directions at the ends thereof opposed to each other in the axial direction of the stator core 30.

Further, the interval between the radially-facing side surfaces 43a and 43b of radially inward adjacent two of the in-slot portions 43 is greater than that of radially outward adjacent two of the in-slot portions 43. Specifically, in the layout of the ends of the in-slot portions 43 in FIG. 7(a), a maximum interval between the side surface 43Aa of the in-slot portion 43A and the side surface 43Bb of the in-slot portion 43B is greater than that between the side surface 43Ea of the in-slot portion 43E and the side surface 43Fb of the in-slot portion 43F.

This embodiment is not limited to a production method of the stator 3 of the electric rotating machine 1. For example, the stator 3 may be assembled by preparing the wave-shaped wires 40, winding the wires 40 in a circle to make the stator coil 4, and attaching the core pieces 32 to the stator coil 4 from outside of the stator coil 4.

The stator 3 of this embodiment has the following beneficial advantages.

The surfaces 43a and 43b of the ends of the in-slot portions 43 of the stator coil 4 which are close to at least one of the axially opposed ends of the stator core 30 (i.e., at least one of the ends of the in-slot portions 43) and face each other in the radial direction of the stator core 30 extend in non-parallel to one another within the slot 31. This layout of the in-slot portions 43 will result in formation of a gap between the radially-facing surfaces 43a and 43b. The non-parallel orientation of the radially-facing surfaces 43a and 43b also avoids close contact between entire areas thereof when the in-slot portions 32 move undesirably within the slot 31 in the radial direction of the stator core 30. In other words, the gap is kept between the radially-facing surfaces 43a and 43b in the vicinity of at least one of the ends of the stator core 30. The gap is a space unoccupied by the in-slot portions 43 and will not be a heat source when the stator coil 4 is excited electrically to operate the electric rotating machine 1, but serve as a radiator to radiate or dissipate heat, as generated by the in-slot portions 43. This minimizes a rise in temperature of the in-slot portions 43 of the stator coil 4 and avoids an increase in electric resistance of the in-slot portions 43.

The gap between the radially-facing surfaces 43a and 43b of the in-slot portions 43 also permits the in-slot portions 43 to be vibrated or oscillated by the Lorentz force produced when the stator coil 4 is excited, thus avoiding the physical damage to the windings 40 of the stator coil 4.

The gap kept between the radially-facing surfaces 43a and 43b serves to decrease the quantity of heat to be transmitted between the in-slot portions 43, thus minimizing the quantity of heat accumulated in the stator coil 4. This minimizes a rise in temperature of the in-slot portions 43 of the stator coil 4 and avoids an undesirable increase in electric resistance of the in-slot portions 43.

The stator 3, as described above, has the impregnating material 6 disposed in the space between the inner wall of each of the slots 31 and the in-slot portions 43. The impregnating material 6 is made of epoxy resin that is greater in coefficient of thermal conductivity than air. The impregnating material 6 works to transmit the heat from the in-slot portions 43 to the stator core 30, thereby decreasing a rise in temperature of the in-slot portions 43 of the stator coil 4 and avoids an undesirable increase in electric resistance of the in-slot portions 43.

The impregnating material 6 also serves as a damper or absorber to absorb the vibrations of the in-slot portions 43 arising from the Lorentz force, thus avoiding collision between the in-slot portions 43 and physical damage thereto.

The intervals between the circumferentially spaced corners of the radially facing side surfaces 43a and 43b of adjacent two of the in-slot portions 43 are, as can be seen from FIGS. 7(a) and 7(c), different from each other and change in relation in magnitude therebetween alternately in the radial direction of the stator core 30. This avoids the concentration of distribution of temperature of the stator core 30. Specifically, a greater gap through which the side surfaces 43a and 43b are farther away from each other is less susceptible to heat from the adjacent in-slot portions 43 than a smaller gap through which the side surfaces 43a and 43b are closer to each other and thus has a higher degree of ability in radiating the heat. If lots of such greater gaps exist close to either side inner wall of the slot 31, it will result in a deviation in quantity of heat to be dissipated in the circumferential direction of the stator core 30 within the slot 31, which leads to a non-uniform distribution of temperature in the stator core 30, thus resulting in an increase in electric resistance of a higher temperature portion of the stator core 30.

The changes in interval between the radially facing side surfaces 43a and 43b of adjacent two of the in-slot portions 43, as already described with reference to FIGS. 7(a) and 7(c), move in opposite circumferential directions of the stator core 30 at the ends of the in-slot portions 43. In other words, the layouts of the transverse sections of the ends of the in-slot portions 43 are symmetrical with respect to the middle portions of the in-slot portions 43, so that the interval between the radially facing side surfaces 43a and 43b of adjacent two of the in-slot portions 43 changes in the opposite circumferential directions of the stator core 30 at the ends of the in-slot portions 43. This is achieved by twisting of the middles of the in-slot portions 43, which minimizes undesirable movement of the in-slot portions 43 in the axial direction of the stator core 30 within the slots 31 and ensures the stability in positional relation between the stator coil 4 and the stator core 30.

The radially facing side surfaces 43a and 43b of the middles of adjacent two of the in-slot portions 43 are, as illustrated in FIG. 7(b), extend parallel to one another, thereby ensuring a gap therebetween which is great enough to dampen the vibrations of the in-slot portions 43 in the radial direction of the stator core 30 which arise from the Lorentz force.

The interval between the radially facing side surfaces 43a and 43b of radially inward adjacent two of the in-slot portions 43 is greater than that of radially outward adjacent two of the in-slot portions 43 within the slot 31. In other words, a maximum interval between the side surface 43a and 43b of the in-slot portions 43 which are located within the slot 31 radially inward of the stator core 30 is greater than that between the side surfaces 43a and 43b of the in-slot portions 43 which are located radially outward of the stator core 30. This enhances the dissipation of heat from the stator coil 4. Specifically, the heat, as generated by the in-slot portions 43 of the stator coil 4, is transmitted to and radiated from the teeth 320 of the stator core 30. The heat in ends of the teeth 320 leading to the back core base 321 is also transmitted to and radiated from the back core base 321. The heat inputted to tips of the teeth 320 from the stator coil 4 is not transmitted greatly to the back core base 321. In other words, the tips of the teeth 320 exhibit a lower degree of ability in radiating the heat. In order to alleviate this drawback, the stator core 30 is so designed that the greater gap is formed between the side surfaces 43a and 43b of the in-slot portions 43 which are located radially inward of the stator core 30, that is, close to the tips of the teeth 320, thereby enhancing the dissipation of heat inputted to the tips of the teeth 320.

Each of the windings 40 has, as described above, the turned portions 44 each of which connects the in-slot portions 43 disposed extending from two of the slots 31 which are away from each other in the circumferential direction of the stator core 30. The turned portions 44 leading from the in-slot portions 43 disposed in the same one of the slots 31 extend in the opposite circumferential directions of the stator core 30 alternately in the depth-wise direction of the slot 31 (i.e., from inward to outward of the stator core 30). This facilitates ease of twisting the in-slot portions 43 to orient the radially facing side surfaces 43a and 43b of adjacent two of the in-slot portions 43 in non-parallel to each other at the ends of the in-slot portions 42.

The windings 40 of the stator coil 4 are, as clearly illustrated in FIGS. 5(a) and 5(b), rectangular in transverse cross section thereof, which also facilitates the ease of twisting the in-slot portions 43 to orient the radially facing side surfaces 43a and 43b of adjacent two of the in-slot portions 43 in non-parallel to each other at the ends of the in-slot portions 42.

The stator 3 of this embodiment is equipped with the stator coil 4 wound in the manner, as illustrated in FIG. 6, but may alternatively include another type of stator coil as long as the in-slot portions 43 are arrayed in the radial direction of the stator core 30 within each of the slots 31.

Figure 8:
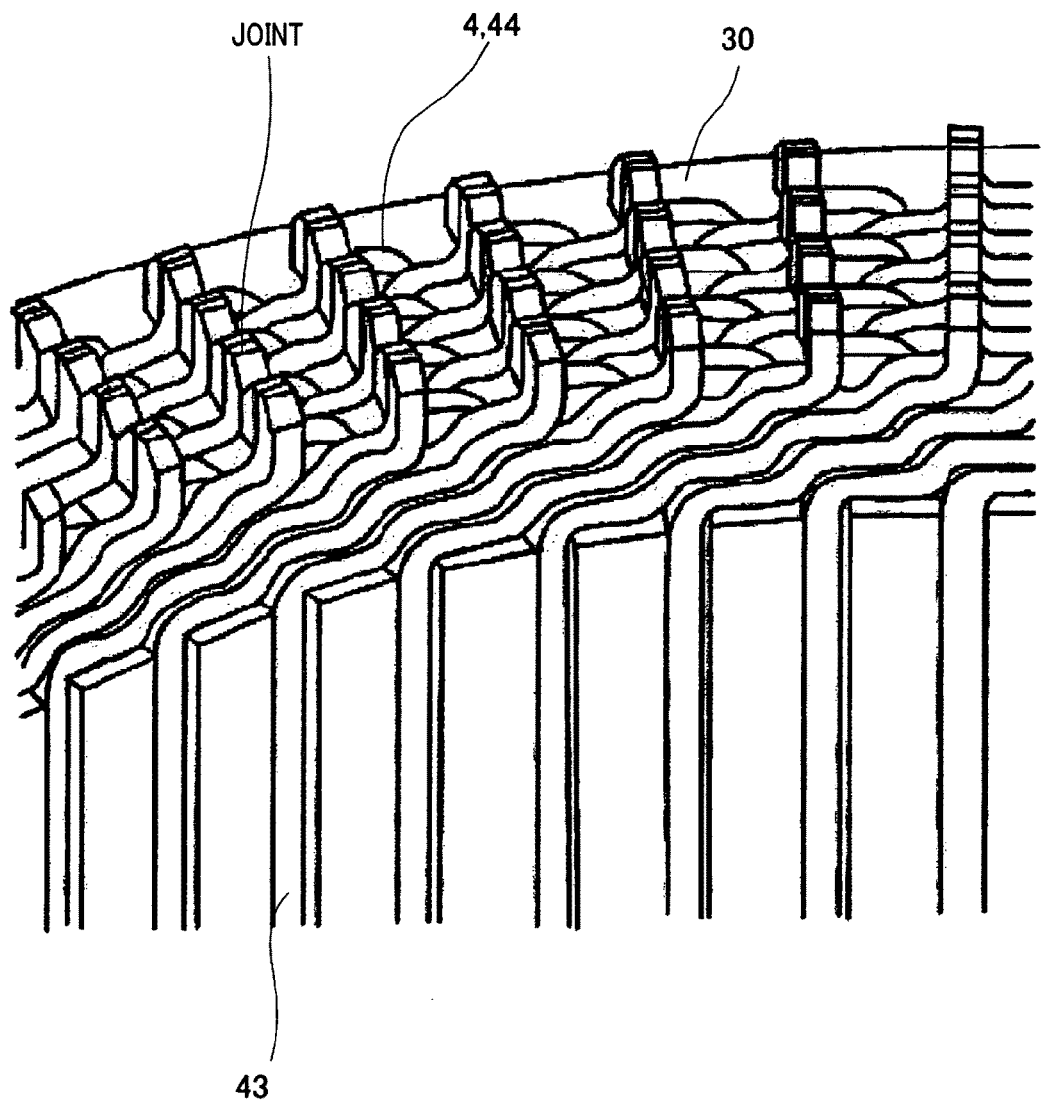
FIG. 8 is a partially enlarged perspective view which illustrates a modified form of a stator coil.

FIG. 8 illustrates a modified form of the stator coil 4 of the stator 3. The stator coil 4 is made up of a plurality of conductor segments which are joined together at ends thereof extending outside at least one of the ends of the stator core 30. Each of the conductor segments includes in-slot portions (corresponding to the in-slot portions 43 in FIG. 6) and turned portions (corresponding to the turned portions 44 in FIG. 6) each of which connects with one of the in-slot portions. The turned portions also establish mechanical connections between two of the conductor segments. The stator coil 4 may be so designed that at least one of the turned portions achieves such a mechanical connection. The ends of the turned portions of the conductor segments, as can be seen from the drawing, extend in parallel to an axial direction of the conductor segments (i.e., the stator core 30) and joined together to make a coil end of the stator coil 4. The ends of the conductor segments have side surfaces placed in contact with each other.

The axially extending ends of the conductor segments serve as radiator fins to dissipate heat from the in-slot portions 43 of the stator coil 4.

FIG. 8 illustrates the ends of all the conductor segments as being joined over one of the ends of the stator core 30, but however, the ends of some of the conductor segments may be placed on one of the ends of the stator core 30, while the ends of the remaining conductor segments may be placed on the other end of the stator core 30.

Figure 9A:
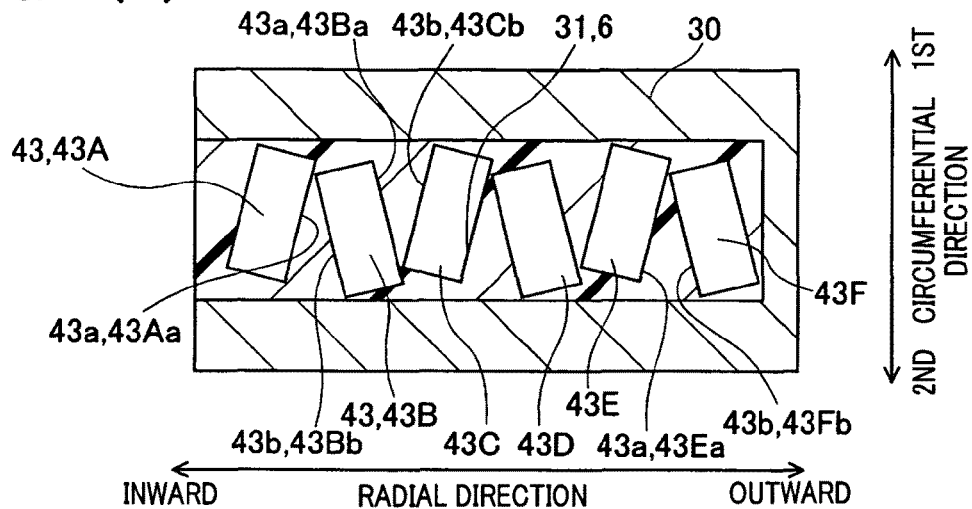
FIG. 9(a) is a transverse sectional view which shows a portion of a stator core of the second modification which is close to one of axially-opposed ends of the stator core.
Figure 9B:
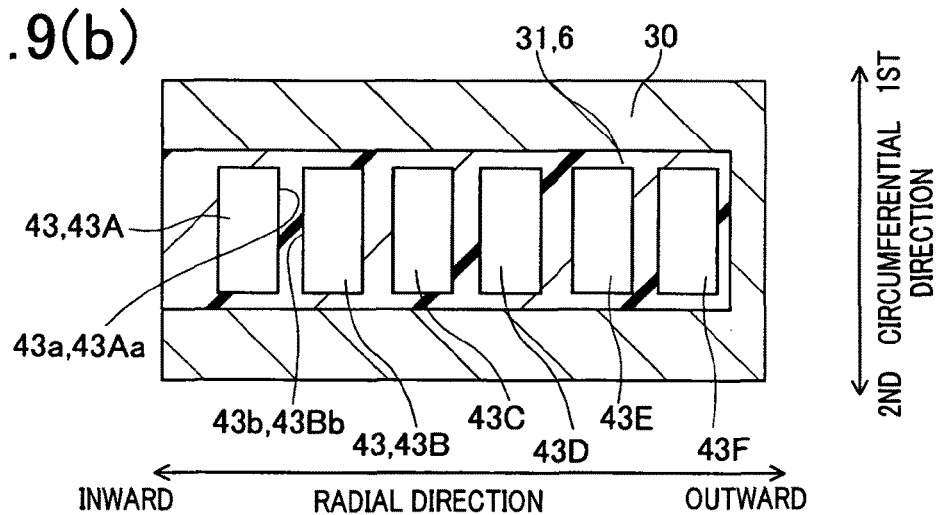
FIG. 9(b) is a transverse sectional view which shows a central portion of a stator core of the second modification which is intermediate between axially-opposed ends of the stator core.
Figure 9C:
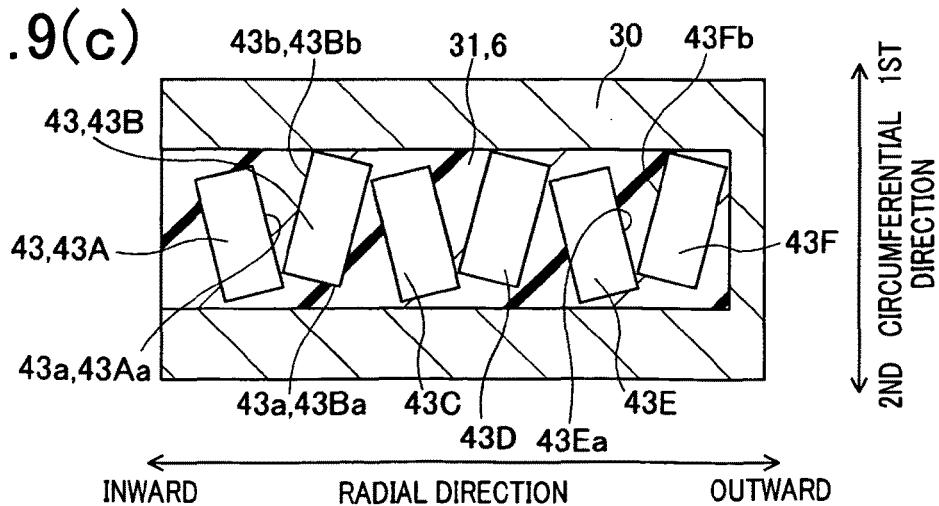
FIG. 9(c) is a transverse sectional view which shows a portion of a stator core of the second modification which is close to the other of the axially-opposed ends of the stator core, as illustrated in FIG. 9(a)
Figure 11:
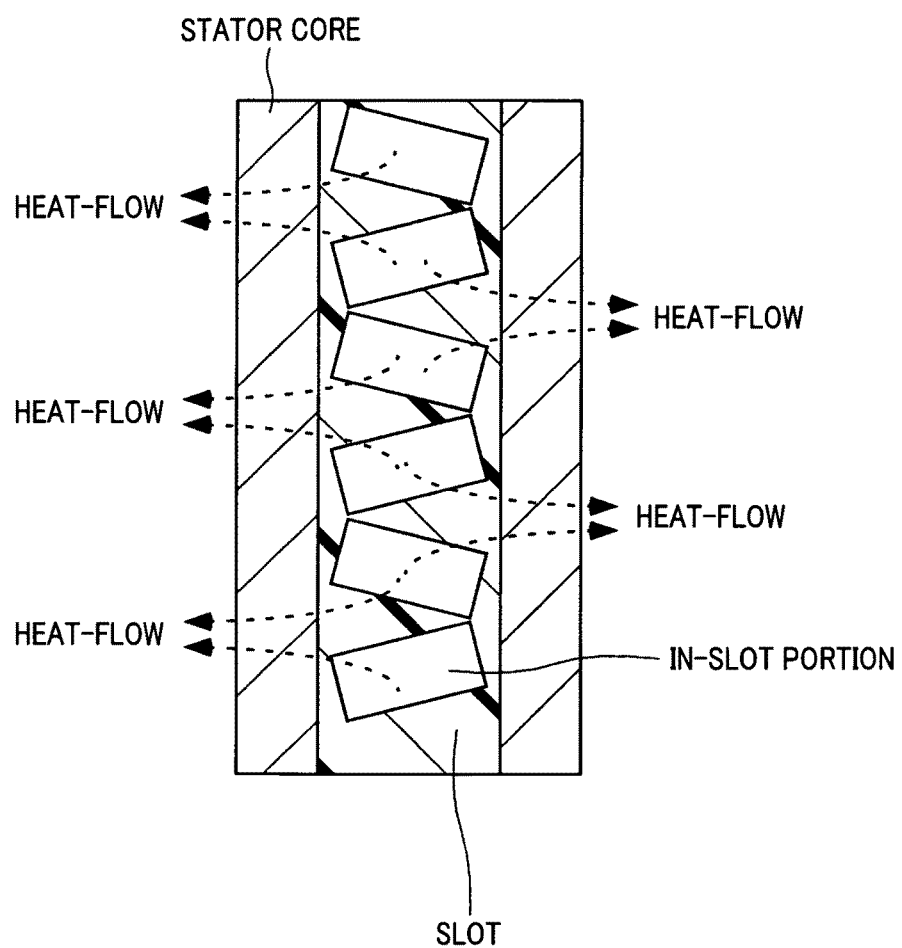
FIG. 11 is a transverse sectional view which demonstrates flows of heat, as generated by a stator coil of the invention.
Figure 12:
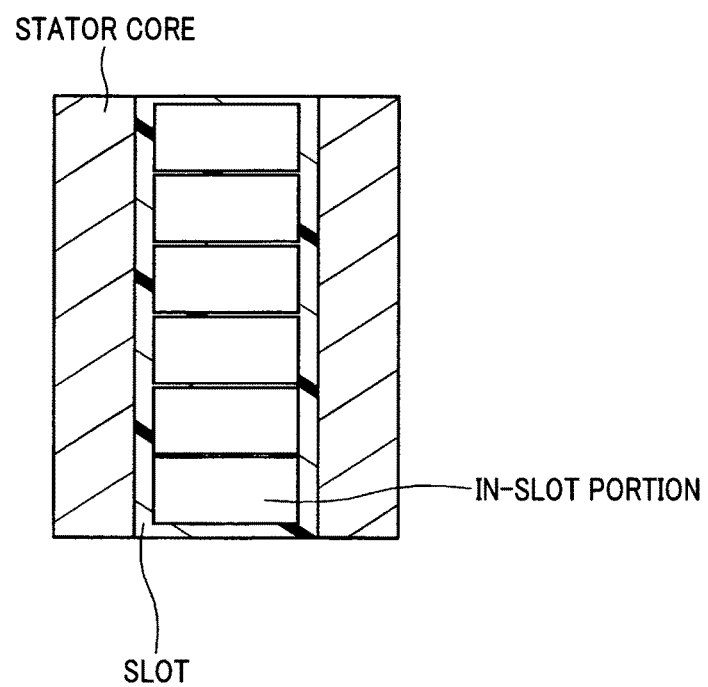
FIG. 12 is a transverse sectional view which shows a conventional stator for use in an electric rotating machine.

FIGS. 9(a) to 9(c) illustrate the second modification of the stator coil 4 of the stator 3, FIG. 9(a) is a transverse sectional view which shows the layout of portions of the in-slot portions 43 close to one of the axially-opposed ends of the stator core 30. FIG. 9(b) is a transverse sectional view which shows the layout of central portions of the in-slot portions 43 placed intermediate between the axially-opposed ends of the stator core 30. FIG. 9(c) is a transverse sectional view which shows the layout of portions of the in-slot portions 43 close to the other end of the stator core 30.

The in-slot portions, as denoted by 43A to 43F, disposed in each of the slots 31 of the stator core 30 are placed to have centers staggered alternately in the first and second circumferential directions of the stator core 30.

Specifically, in the layout of the ends of the in-slot portions 43A to 43F of the stator coil 4 illustrated in FIG. 9(a), the in-slot portion 43B is shifted from the in-slot portion 43A located radially innermost of the stator core 30 in the second circumferential direction of the stator core 30. The in-slot portion 43C placed outward of the in-slot portion 43B is shifted from the in-slot portion 43B in the first circumferential direction of the stator core 30. In this way, the in-slot portions 43B, 43D, and 43F are shifted from the in-slot portions 43A, 43C, and 43E in the second circumferential direction of the stator care 30. A corner (or an end) of a side surface 43Aa of the in-slot portion 43A which faces and lies closest to the in-slot portion 43B is located outward of a corner of a side surface 43Bb of the in-slot portion 43B which faces and lies closest to the in-slot portion 43A within the slot 31 in the radial direction of the stator core 30. Similarly, a corner of a side surface 43Ba of the in-slot portion 43B which faces and lies closest to the in-slot portion 43C is located within the slot 31 radially outward of a corner of a side surface 43Cb of the in-slot portion 43C which faces and lies closest to the in-slot portion 43B. The same is true for the in-slot portions 43D, 43E, and 43F.

In the layout of the ends of the in-slot portions 43A to 43F of the stator coil 4 illustrated in FIG. 9(c), the in-slot portion 43B is shifted from the in-slot portion 43A located radially innermost of the stator core 30 in the first circumferential direction of the stator core 30. The in-slot portion 43C placed outward of the in-slot portion 43B is shifted from the in-slot portion 43B in the second circumferential direction of the stator core 30. In this way, the in-slot portions 43B, 43D, and 43F are shifted from the in-slot portions 43A, 43C, and 43E in the first circumferential direction of the stator core 30. A corner (or an end) of the side surface 43Aa of the in-slot portion 43A which faces and lies closest to the in-slot portion 43B is located within the slot 31 radially outward of a corner of the side surface 43Bb of the in-slot portion 43B which faces and lies closest to the in-slot portion 43A. Similarly, a corner of the side surface 43Ba of the in-slot portion 43B which faces and lies closest to the in-slot portion 43C is located within the slot 31 radially outward of a corner of the side surface 43Cb of the in-slot portion 43C which faces and lies closest to the in-slot portion 43B. The same is true for the in-slot portions 43D, 43E, and 43F.

The radially facing side surfaces 43a and 43b of the middle portions of adjacent two of the in-slot portions 43A to 43F are, as illustrated in FIG. 9(b), extend parallel to one another.

Further, the in-slot portions 43A to 43F are located within the slot 31 closer to one another than those in FIGS. 7(a) to 7(c) in the radial direction of the stator core 30. In other words, the interval between adjacent two of the in-slot portions 43A to 43F is smaller than that in FIGS. 7(a) to 7(c).

As apparent from the above description, end surfaces of transverse sections of the in-slot portions 43A to 43F which are opposed to one another in the circumferential direction of the stator core 30 are staggered alternately. This permits a total distance between the in-slot portions 43A located radially innermost of the stator core 30 and the in-slot portion 43F radially outermost of the stator core 30 to be decreased as compared with the layout of the in-slot portions 43A to 43F in FIGS. 7(a) to 7(c). FIG. 10(a) demonstrates a positional relation between the rotor 2 and the array of the in-slot portions 43A to 43F, as illustrated in FIG. 7(a). FIG. 10(b) demonstrates a positional relation between the rotor 2 and the array of the in-slot portions 43A to 43F, as illustrated in FIG. 9(a). Comparison between FIGS. 10(a) and 19(b) shows that the layout of the in-slot portions 43A to 43F in FIGS. 9(a) to 9(c) allows the distance between the rotor 2 and the in-slot portions 43A located radially innermost of the stator core 30 within the slot 31 to be increased, thereby resulting in a decrease in loss of eddy current in the stator coil 4, which leads to a decrease in quantity of heat to be generated by the stator coil 4.

The stator coil 4, as referred to above, is formed by the three-phase windings 40. Each of the windings 40 may be made up of sixteen conductor segments. The stator coil 4 of the above embodiment is so designed that the two turned portions 44 that are the ends of each of the conductor segments and lead from the in-slot portions 43 located radially innermost of the stator core 30 within the slots 31 extend in the same circumferential direction of the stator core 30, but however, they may alternatively extend in opposite circumferential directions of the stator core 30.

The ends 40a and 40b of each of the windings 40, as clearly illustrated in FIG. 6, extend outward of the stator coil 4, however, may alternatively be disposed radially outside and inside the stator coil 4, respectively.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A stator for an electric rotating machine comprising:
a cylindrical stator core which has a plurality of slots arrayed in a circumferential direction of the stator core; and
a stator coil wound in the stator core, the stator coil having a plurality of in-slot portions arrayed in a radial direction of the stator core within each of the slots, each of the in-slot portions extending in an axial direction of the stator core within a corresponding one of the slots, adjacent two of the in-slot portions disposed in each of the slots having radially-facing surfaces which face each other in the radial direction of the stator core and extend non-parallel to one another at least one of ends of the adjacent two in-slot portions.

2. A stator as set forth in claim 1, wherein an interval between portions of the radially-facing surfaces on a side of a first circumferential direction that is one of circumferential directions of the stator core is different from that between portions of the radially-facing surfaces on a side of a second circumferential direction that is the other of the circumferential directions of the stator core at the at least one of the ends of the adjacent two in-slot portions.

3. A stator as set forth in claim 2, wherein the interval between the portions of the radially-facing surfaces of a first pair of adjacent two of the in-slot portions on the side of the first circumferential direction is greater than that between the portions of the radially-facing surfaces of the first pair on the side of the second circumferential direction at the at least one of the ends, while the interval between the portions of the radially-facing surfaces of a second pair of adjacent two of the in-slot portions next to the first pair on the side of the first circumferential direction is smaller than that between the portions of the radially-facing surfaces of the first pair on the side of the second circumferential direction at the at least one of the ends.

4. A stator as set forth in claim 1, wherein an interval between portions of the radially-facing surfaces on a side of a first circumferential direction that is one of circumferential directions of the stator core is greater than that between portions of the radially-facing surfaces on a side of a second circumferential direction that is the other of the circumferential directions of the stator core at one of the ends of the adjacent two in-slot portions, while an interval between the portions of the radially-facing surfaces on the side of the first circumferential direction is smaller than that between portions of the radially-facing surfaces on the side of the second circumferential direction at the other end of the adjacent two in-slot portions.

5. A stator as set forth in claim 1, wherein the radially-facing surfaces of the adjacent two in-slot portions extend in parallel to one another at middles intermediate between the ends thereof.

6. A stator as set forth in claim 1, further comprising an impregnating material disposed in a space between each of the slots and the in-slot portions arrayed in the slot.

7. A stator as set forth in claim 6, wherein the impregnating material is greater in coefficient of thermal conductivity than air.

8. A stator as set forth in claim 1, wherein the stator core includes back core bases and teeth two of which extend from one of the back core bases in the radius direction of the stator core to define each of the slots, and wherein an interval between the radially-facing surfaces of adjacent two of the in-slot portions which are located within the slot farther from the back core base may be greater than that between of the radially-facing surfaces of adjacent two of the in-slot portions which are located within the slot closer to the back core base.

9. A stator as set forth in claim 1, wherein the stator coil also includes turned portions each of which is disposed outside the slots and connects two of the in-slot portions which are disposed in two of the slots, respectively, which are spaced in a circumferential direction of the stator core, and wherein ones of the turned portions which connect with the in-slot portions disposed in one of the slots are arrayed in a depth-wise direction of the slot and extend in opposite circumferential directions of the stator core alternately.

10. A stator as set forth in claim 9, wherein at least one of the turned portions connects conductor segments making up the stator coil.

11. A stator as set forth in claim 1, wherein the stator coil is rectangular in transverse cross section thereof.

* * * * *